Jan. 3, 1928.
E. D. ROATH
1,654,755
WHEEL ATTACHMENT FOR VEHICLES
Filed Dec. 13, 1926
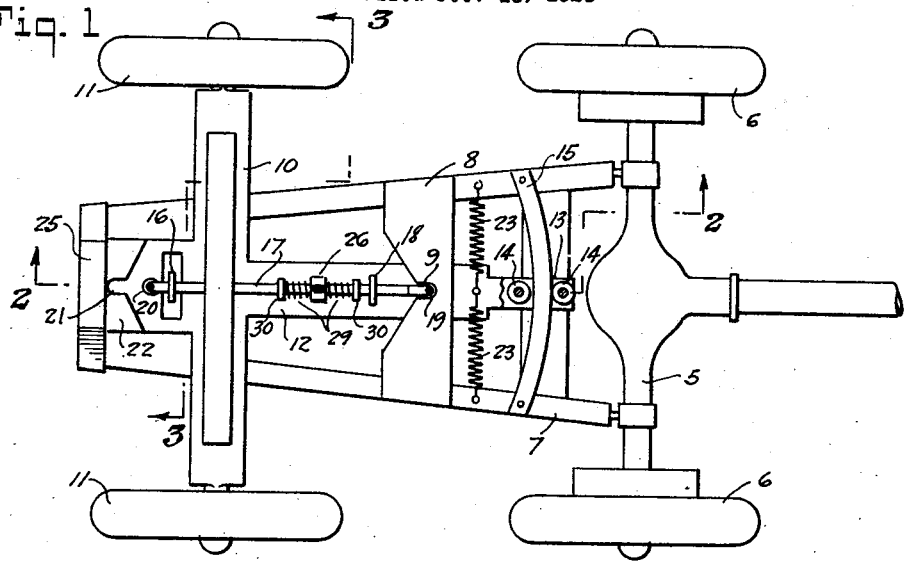
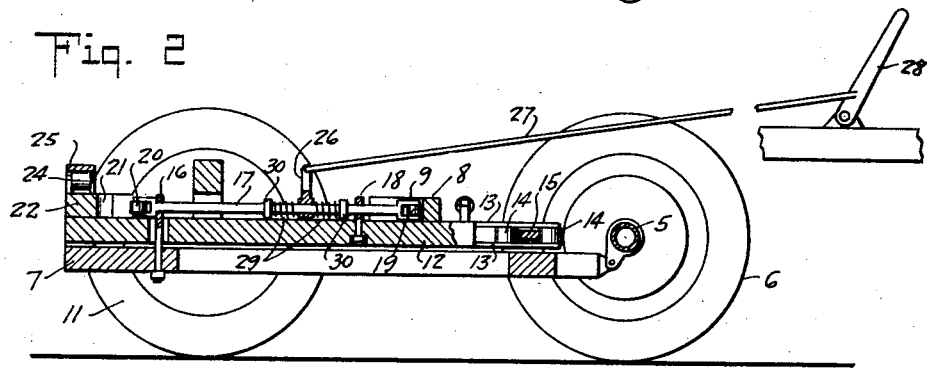
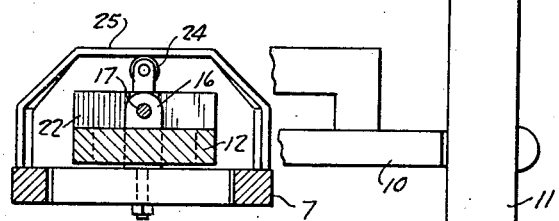
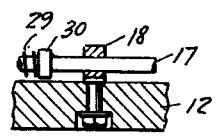
INVENTOR.
Ernest David Roath
BY Nestall and Wallace
ATTORNEYS.

Patented Jan. 3, 1928.

1,654,755

UNITED STATES PATENT OFFICE.

ERNEST DAVID ROATH, OF NEAR PASADENA, CALIFORNIA.

WHEEL ATTACHMENT FOR VEHICLES.

Application filed December 13, 1926. Serial No. 154,451.

This invention relates to a pair of wheels combined with guiding means for their attachment to a vehicle having the usual number of four or more wheels. The invention may be embodied in a unit properly termed a two wheeled trailer or may be embodied in combination with a four wheeled vehicle to form a complete unit.

The objects of this invention are first, to provide a device of the character described the wheels of which will be guided in the path of travel of the vehicle either in going ahead or backing up; second, to provide a frame supported by the wheels and axle and serving for coupling the latter to the vehicle; and third, to provide a pivotal coupling controlled by the operator so as to properly guide the wheels in either forward or backward movement of the vehicle; and fourth, to provide details of structure whereby an efficient, simple, durable economical and novel device of the character described is obtained.

These objects together with other objects and corresponding accomplishments are obtained by means of the embodiment of my invention illustrated in the accompanying drawing, in which Fig. 1 is a plan view showing a fragment of the chassis of a motor vehicle with my structure secured thereto; Fig. 2 is a section as seen on the line 2—2 of Fig. 1; Fig. 3 is a fragmentary view as seen on the line 3—3 of Fig. 1; and Fig. 4 is a detail showing a fragment of the selector as illustrated in Fig. 2 and on an enlarged scale.

Referring with more particularity to the drawing, 5 indicates the rear axle of a motor vehicle, which vehicle may have the usual number of four wheels, although the invention is not limited to use with a four wheel vehicle. Wheels 6 mounted upon the axle are, in this instance, illustrated as driving wheels. Hingedly secured to the axle 5 is a frame indicated generally by 7 and comprising side bars, bridged at an intermediate portion by pivotal coupling member 8. The coupling member 8 has a recess 9 facing the rear.

Journalled upon the ends of an axle 10 are ground wheels 11. A cross tongue 12 is fixed to the axle and extends forwardly thereof and to the rear. The forward end of the tongue has spaced bars 13 between which are journalled rollers 14 on vertical axis. This structure comprises a draw bar roller coupler. Affixed to the frame is an arcuate sector 15 for the rollers to ride against. The construction is such that the rollers and sectors provide a draw bar for pushing and pulling the attachment. Mounted upon the frame is a bracket 16 extending through a slot in the tongue and having an eye through which slidably extends a selector rod 17. Forward of the axle is a bracket 18 serving as a guide for the rod. Journalled upon a vertical axis at the forward end of the selector is a roller 19 and at the rear end is a roller 20. The selector is so arranged that roller 19 may be projected into the recess 9 or roller 20 may be projected into the recess 21 formed in a pivotal coupler block 22 secured to the rear end of the tongue. With roller 19 in recess 9 the wheels 11 are secured to the frame upon a pivotal axis located forward of the axle and suitable for the guiding of the wheels as the vehicle travels forward. If the roller 20 is in recess 21, the pivotal connection is to the rear of the axle about roller 20. The arrangement is such that the wheels are guided when the pivotal connection is at the rear when the machine is backed up.

Secured to the tongue and to the side of the frame 7 are springs 23 serving to steady the tongue in its movement. To aid in the free swinging movement of the tongue, a roller 24 is secured to the tongue and rides against a bridge member 25 mounted upon the frame. Slidably mounted on the selector rod 17 is an arm 26 for connection thereto of a link. The link indicated by 27 in Fig. 2 extends forwardly to the vehicle and is attached to an operating lever 28. This provides for moving the selector longitudinally either forward or backward into the selected recesses. Normally the selector should be in the forward position. In order to provide for a limited movement of the arm 26 upon the selector bar, it is slidably mounted thereon and yieldably secured in position by compression springs 29 abutting collars 30 upon the selector.

In going forward, the parts are in a position shown in Figs. 1 and 2, the wheels 11 being pivotally secured at recess 9 to the frame forward of their axle. When it is desired to back, the selector is moved to the rear so as to engage recess 21, thereby causing the wheels to pivot about an axis at roller 20 and thereby to be guided.

The construction is such that the wheels which are added to the vehicle will carry their proportional load due to the hinged attachment of the frame to the vehicle. The result in adding the extra pair of wheels is to reduce the load on any one wheel. By reason of the guiding of the wheels at the rear, there is less slippage or tendency to skid. Obviously, the attachment may be made a permanent or integral part of the vehicle or may be arranged so as to be attached or detached as desired. It is also obvious that the wheels may support an independent load and thereby act as a trailer.

What I claim is:

1. In combination with a vehicle, a device of the class described comprising a frame secured to said vehicle against lateral swinging thereon, an axle having ground wheels secured to said frame, and steering means for causing said wheels to be guided, said steering means being connectable to said frame either in advance of or behind said axle.

2. In combination with a vehicle, a device of the class described comprising a frame secured to said vehicle against lateral swinging thereon, an axle having ground wheels, means to pivotally secure said axle to said frame selectively either forward thereof or to the rear.

3. In combination with a vehicle, a device of the class described comprising a frame secured to said vehicle against lateral swinging thereon, an axle having ground wheels, means to pivotally secure said axle to said frame forward thereof or to the rear, and means operable from said vehicle to selectively couple said axle to one of the pivotal axis.

4. In combination with a vehicle, a device of the class described comprising a frame secured to said vehicle against lateral swinging thereof, an axle having ground wheels, means to pivotally secure said axle to said frame selectively either forward thereof or to the rear, and draw bar means to secure said axle to said frame.

5. In combination with a vehicle, a device of the class described comprising a frame secured to said vehicle against lateral swinging thereon, an axle having ground wheels, means to pivotally secure said axle to said frame either forward thereof or to the rear, means operable from said vehicle to selectively couple said axle to one of the pivotal axes, and draw bar means to secure said axle to said frame.

6. In combination with a vehicle, a device of the class described comprising a frame secured to said vehicle against lateral swinging thereon, an axle having ground wheels, a cross tongue secured to said axle, a pivot connector for securing said cross tongue to said frame on a pivotal axis selected either at the front or rear of said axle.

7. In combination with a vehicle, a device of the class described comprising a frame secured to said vehicle against lateral swinging thereon, an axle having ground wheels, a cross tongue secured to said axle, a pivot connector for securing said cross tongue to the frame on a pivotal axis selected either at the front or rear of said axle, and draw bar means to secure said tongue to said frame.

8. In combination with a vehicle, a device of the class described comprising a frame hingeably secured thereto for up and down movement and held against lateral movement, an axle having ground wheels thereon, a cross tongue fixed to said axle, a draw bar sector secured to said frame, a draw bar roller coupling securing said tongue to said sector so that the tongue may ride over said sector, a pivotal connector on said tongue arranged to be selectively actuated to pivotally secure said tongue to said frame either at the front or rear of said axle.

9. In combination with a vehicle, a device of the class described comprising a frame hingeably secured thereto for up and down movement and held against lateral movement, an axle having ground wheels thereon, a cross tongue fixed to said axle, a draw bar sector secured to said frame, a draw bar roller coupling securing said tongue to said sector so that the tongue may ride thereover, a pivotal coupler on said frame in front of said axle, a pivotal coupler on said frame at the rear of said axle, a pivotal selector disposed on said tongue for longitudinal movement so as to be operatively connected with either of said couplers.

10. In combination with a vehicle, a device of the class described, comprising a frame hingeably secured thereto for up and down movement and against lateral movement, an axle having ground wheels thereon, a cross tongue fixed to said axle, a draw bar sector secured to said frame, a draw bar roller coupling securing said tongue to said sector so that said tongue may ride thereover, a pivotal coupler on said frame in front of said axle, a pivotal coupler on said frame at the rear of said axle, a pivotal selector disposed on said tongue for longitudinal movement so as to be operatively connected with either of said couplers, and means to actuate said selector from the vehicle couplers.

11. A device of the class described comprising a frame, an axle having ground wheels thereon, a cross tongue fixed to said axle, a draw bar sector secured to said frame, a draw bar roller coupling securing said tongue to said sector so that the tongue may ride thereover, a pivotal connector on said tongue arranged to be selectively actuated to pivotally secure said tongue to said frame either at the front or rear of said axle.

12. A device of the class described comprising a frame, an axle having ground wheels thereon, a cross tongue fixed to said axle, a draw bar sector secured to said frame, a draw bar roller coupling securing said tongue to said sector so that the tongue may ride thereover, a pivotal coupling on said frame in front of said axle, a pivotal coupling on said frame at the rear of said axle, and a pivotal selector disposed on said tongue for longitudinal movement so as to be operatively connected with either of said couplers.

In witness that I claim the foregoing I have hereunto subscribed my name this 2nd day of December, 1926.

ERNEST DAVID ROATH.